(12) United States Patent
Doan et al.

(10) Patent No.: US 6,952,302 B2
(45) Date of Patent: Oct. 4, 2005

(54) HINGE STRUCTURES FOR MICRO-MIRROR ARRAYS

(75) Inventors: Jonathan C. Doan, Mountain View, CA (US); Satyadev R. Patel, Elk Grove, CA (US); Robert M. Duboc, Jr., Menlo Park, CA (US)

(73) Assignee: Reflectivity, Inc, Sunnyvale, CA (US)

( * ) Notice: Subject to any disclaimer, the term of this patent is extended or adjusted under 35 U.S.C. 154(b) by 0 days.

(21) Appl. No.: 10/365,951

(22) Filed: Feb. 12, 2003

(65) Prior Publication Data

US 2004/0156089 A1 Aug. 12, 2004

Related U.S. Application Data

(63) Continuation-in-part of application No. 10/155,744, filed on May 24, 2002, now Pat. No. 6,741,383, which is a continuation-in-part of application No. 09/637,479, filed on Aug. 11, 2000, now Pat. No. 6,396,619.

(51) Int. Cl.$^7$ .............................................. G02F 26/00
(52) U.S. Cl. ...................................... 359/291; 359/290
(58) Field of Search .................................. 359/291, 290, 359/295, 298, 237, 223, 224; 348/770

(56) References Cited

U.S. PATENT DOCUMENTS

| | | |
|---|---|---|
| 5,504,614 A | 4/1996 | Webb et al. |
| 5,552,924 A | 9/1996 | Tregilgas |
| 5,567,334 A | 10/1996 | Baker et al. |
| 5,604,625 A | 2/1997 | Henck |
| 5,652,671 A | 7/1997 | Knope et al. |
| 5,696,619 A | 12/1997 | Knope et al. |
| 5,942,054 A | 8/1999 | Tregilgas et al. |
| 2002/0196524 A1 * | 12/2002 | Huibers et al. ............. 359/291 |

* cited by examiner

*Primary Examiner*—Scott J. Sugarman
*Assistant Examiner*—Richard Hanig
(74) *Attorney, Agent, or Firm*—Gregory R. Muir

(57) ABSTRACT

A method and spatial light modulator are provided herein. The spatial light modulator has a higher resolution and an increased fill factor. The spatial light modulator also provides an increased contrast ratio. Furthermore, the spatial light modulator of the present invention can be operated in the absence of polarized light and that has improved electro-mechanical performance and robustness with respect to manufacturing. A method and its alternative are disclosed herein by the present invention for manufacturing the spatial light modulator.

77 Claims, 5 Drawing Sheets

HINGE STRUCTURES FOR MICRO-MIRROR ARRAYS

CROSS-REFERENCE TO RELATED PATENT APPLICATIONS

The present invention is a continuation-in-part of U.S. patent application Ser. No. 10/155,744 to Huibers et al, filed May 24, 2002, (now U.S. Pat. No. 6,741,383), which is a continuation-in-part of application Ser. No. 09/637,479 filed Aug. 11, 2000 (now U.S. Pat. No. 6,396,619).

TECHNICAL FIELD OF THE INVENTION

The present invention is related generally to spatial light modulators, and, more particularly, to spatial light modulators with novel hinge structures and methods for making the same.

BACKGROUND OF THE INVENTION

Spatial Light Modulators (SLMs) are transducers that modulate an incident beam of light in a spatial pattern that corresponds to an optical or electrical input. A type of SLM is the SLM based on Micro Electro-Mechanical Systems (MEMS). A typical MEMS-based SLM consists of an array of micro-mirrors mounted on movable elements. Each individual micro-mirror can be independently deflected by an electrostatic force. Reflection of a beam of incident light impinging a micro-mirror can then be controlled, for example by deflecting the micro-mirror through changing the electrostatic force applied to the micro-mirror.

Currently, varieties of MEMS-based SLMs for use in display systems have been developed. Regardless of the differences, a common basic configuration of the MEMS-based SLMs comprises a hinge and a micro-mirror plate that is attached to the hinge for rotating relative to the substrate by the hinge. And the mechanism of the MEMS-based SLMs for display is based on rotating the micro-mirror plate of individual micro-mirrors along the hinge at different angles, thus reflecting incident light onto or away from a display target at the different angles. In this regard, mechanical properties of the hinge, the micro-mirror plate and the attachment of the two are critical factors to the overall performance of the micro-mirrors and the quality of the displayed images.

Therefore, what is needed is a spatial light modulator having micro-mirrors with robust mechanical properties for use in display systems.

SUMMARY OF THE INVENTION

In view of the foregoing, the present invention provides a spatial light modulator that has improved mechanical performance and robustness In an embodiment of the invention, a hinge for use in a micro-mirror device is disclosed herein. According to the embodiment, the hinge comprises: a top metal layer, where the metal is an elemental substance or an alloy or a metalloid; a bottom metal layer, where the metal is an elemental substance or an alloy or a metalloid; and an intermediate ceramic layer between the top and bottom metal layers.

In another embodiment of the invention, a hinge for use in a micro-mirror device is provided herein. The hinge comprises: a conductive top layer with a resistivity less than 100,000 $\mu\Omega$·cm; an insulator intermediate layer with a resistivity greater than 100,000 $\mu\Omega$·cm; and a conductive bottom layer with a resistivity less than 100,000 $\mu\Omega$·cm.

In yet another embodiment of the invention, a hinge for use in a micro-mirror device is provided herein, which comprises: a top layer with resistance to a gas-phase etchant; an intermediate layer with a lower resistance than the top layer to the gas-phase etchant; and a bottom layer with a higher resistance than the intermediate layer to the gas-phase etchant;

In still yet another embodiment of the invention, a hinge for use in a micro-mirror device is disclosed herein, the device comprising: a top ceramic layer; a bottom ceramic layer; and an intermediate metal layer between the top ceramic layer and bottom ceramic layer.

In yet another embodiment of the invention, a hinge for use in a micro-mirror device is provided herein, the device comprising: a top layer with a creep rate at the device operating temperature; an intermediate layer with a creep rate higher than that of the top layer; and a bottom layer with a creep rate lower than the intermediate layer.

In yet another embodiment of the invention, a method is provided herein for making a micro-mirror device. The method comprises: providing a substrate; depositing a first sacrificial layer on the substrate; forming the micro-mirror plate on the first sacrificial layer; depositing a second sacrificial layer on the micro-mirror plate; patterning the second sacrificial layer according to a structure of the hinge; forming the hinge on the patterned second sacrificial layer, further comprising: depositing a bottom layer comprised of a material with resistivity lower than 100,000 $\mu\Omega$·cm; depositing an intermediate layer that comprises a material with resistivity higher than $10^{12}$ $\mu\Omega$·cm; depositing a top layer that comprises a material with resistivity lower than 100,000 $\mu\Omega$·cm; and providing a means to connect the bottom, intermediate, and top layers directly or indirectly to the substrate; and removing the first and second sacrificial layers so that the bottom, intermediate, and top layers are free to move relative to the substrate.

In yet another embodiment of the invention, a method of making a micro-mirror device is disclosed herein. The method comprises: providing a substrate; depositing a first sacrificial layer on the substrate; forming the micro-mirror plate on the first sacrificial layer; depositing a second sacrificial layer on the micro-mirror plate; patterning the second sacrificial layer according to a structure of the hinge; forming the hinge on the patterned second sacrificial layer, further comprising: depositing a bottom layer comprised of a material with a resistance to a spontaneous chemical vapor phase etchant; depositing an intermediate layer that comprises a material with a lower resistance than that of the bottom layer to the spontaneous chemical vapor phase etchant; depositing a top layer that comprises a material with a higher resistance than that of the intermediate layer to the spontaneous chemical vapor phase etchant; and providing a means to connect the bottom, intermediate, and top layers directly or indirectly to the substrate; and removing the sacrificial layer so that the bottom, intermediate, and top layers are free to move relative to the substrate.

In yet another embodiment of the invention, a method of making a micro-mirror device, the device comprising a hinge and a micro-mirror plate attached to the hinge such that the micro-mirror plate can rotate relative to the substrate by the hinge is disclosed herein. The method comprises: providing a substrate; depositing a first sacrificial layer on the substrate; forming the micro-mirror plate on the first sacrificial layer; depositing a second sacrificial layer on the micro-mirror plate; patterning the second sacrificial layer according to a structure of the hinge; forming the hinge on the patterned second sacrificial layer, further comprising: depositing a layer that comprises a ceramic; depositing a layer that comprises a conductor; depositing a layer that comprises a ceramic; and providing a means to connect the metal and ceramic layers directly or indirectly to the substrate; and removing the first and second sacrificial layers such that the metal and ceramic layers are free to move relative to the substrate.

In still another embodiment of the invention, a method of making a micro-mirror device, the device comprising a hinge and a micro-mirror plate attached to the hinge such that the micro-mirror, plate can rotate relative to the substrate by the hinge, is disclosed herein. The method comprises: providing a substrate; depositing a first sacrificial layer on the substrate; forming the micro-mirror plate on the first sacrificial layer; depositing a second sacrificial layer on the micro-mirror plate; patterning the second sacrificial layer according to a structure of the hinge; forming the hinge on the patterned second sacrificial layer, further comprising: providing a substrate; depositing a sacrificial layer on the substrate; depositing a bottom layer comprised of a material with a creep rate, the creep rate being effective at the operating temperature of the device; depositing an intermediate layer that comprises a material with a higher creep rate than that of the bottom layer; depositing a top layer that comprises a material with a lower creep rate than that of the intermediate layer; and providing a means to connect the bottom, intermediate, and top layers directly or indirectly to the substrate; and removing the first and second sacrificial layers such that the bottom, intermediate, and top layers are free to move relative to the substrate.

In yet another embodiment of the invention, a method is provided for making a micro-mirror device, the device comprising a hinge and a micro-mirror plate attached to the hinge such that the micro-mirror plate can rotate relative to the substrate by the hinge. The method comprises: providing a substrate; depositing a first sacrificial layer on the substrate; forming the micro-mirror plate on the first sacrificial layer; depositing a second sacrificial layer on the micro-mirror plate; patterning the second sacrificial layer according to a structure of the hinge; forming the hinge on the patterned second sacrificial layer, further comprising: depositing a bottom layer; depositing an intermediate layer that experiences a diminished amount of oxidation due to the presence of the bottom layer; depositing a top layer that causes the intermediate layer to experience a diminished amount of oxidation; and providing a means to connect the bottom, intermediate, and top layers directly or indirectly to the substrate; and removing the first and second sacrificial layers such that the bottom, intermediate, and top layers are free to move relative to the substrate.

In yet another embodiment of the invention, a method for making a spatial light modulator is provided herein. The method comprises: providing a substrate; depositing a sacrificial material on the substrate; depositing a plurality of structural layers on the sacrificial material, wherein a layer of the plurality of structural layers comprises an early transition metal; and removing the sacrificial material in a spontaneous chemical vapor-phase interhalogen or noble gas halide etchant, wherein the layer comprising the early transition metal is exposed to the gas-phase etchant during the removal of the sacrificial material.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

Processes for micro-fabricating a MEMS device such as a movable micro-mirror and mirror array are disclosed in U.S. Pat. Nos. 5,835,256 and 6,046,840 both to Huibers, the subject matter of each being incorporated herein by reference. A similar process for forming MEMS movable elements (e.g. mirrors) on a wafer substrate (e.g. a light transmissive substrate or a substrate comprising CMOS or other circuitry) is illustrated in the present application. By "light transmissive", it is meant that the material will be transmissive to light at least in operation of the device (The material could temporarily have a light blocking layer on it to improve the ability to handle the substrate during manufacture, or a partial light blocking layer for decreasing light scatter during use.) Regardless, a portion of the substrate, for visible light applications, is preferably transmissive to visible light during use so that light can pass into the device, be reflected by the mirrors, and pass back out of the device. Of course, not all embodiments will use a light transmissive substrate. By "wafer" it is meant any substrate on which multiple micro-mirrors or microstructure arrays are to be formed and which allows for being divided into dies, each die having one or more micro-mirrors thereon. Though not in every situation, often each die is one device or product to be packaged and sold separately. Forming multiple "products" or dies on a larger substrate or wafer allows for lower and faster manufacturing costs as compared to forming each die separately. Of course the wafers can be any size or shape, though it is preferred that the wafers be the conventional round or substantially round wafers (e.g. 4", 6" or 12" in diameter) so as to allow for manufacture in a standard foundry.

U.S. patent applications Ser. No. 09/910,537 filed Jul. 20, 2001, and Ser. No. 60/300,533 filed Jun. 22, 2001 both to Reid contain examples of materials that may be used for the various components of the current invention. These applications are incorporated herein by reference.

Figure 1:
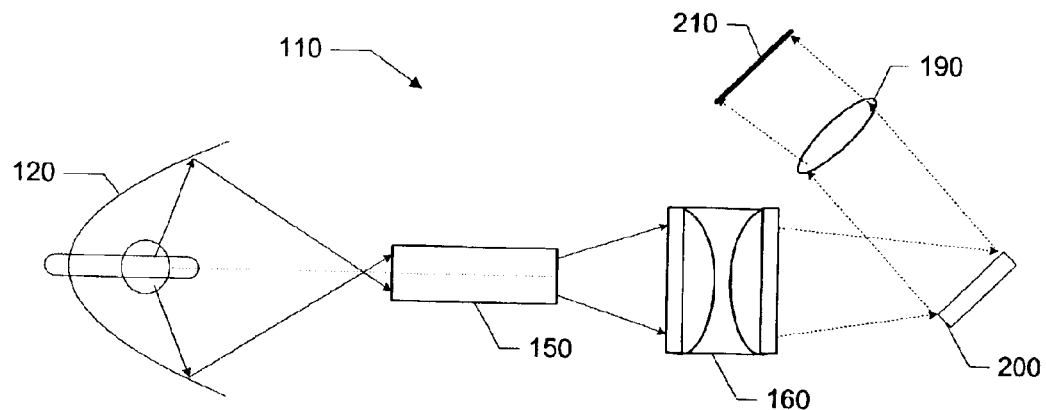
FIG. 1 is a diagram illustrating an exemplary display system employing a spatial light modulator.

The spatial light modulator of the present invention has a variety of applications, one of which is in display systems. A typical display system employing a spatial light modulator is illustrated in FIG. 1. In its very basic configuration, the display system comprises light source 120, optical devices (e.g. light pipe 150, lens 160 and 190), display target 210 and spatial light modulator 200. Light source 120 (e.g. an arc lamp) directs light through the optical devices (e.g. light pipe 150 and object lens 160) and shines on spatial light modulator 200. Spatial light modulator 200 selectively reflects the incident light toward optical device 190 and results in an image on display target 210.

Figure 2:
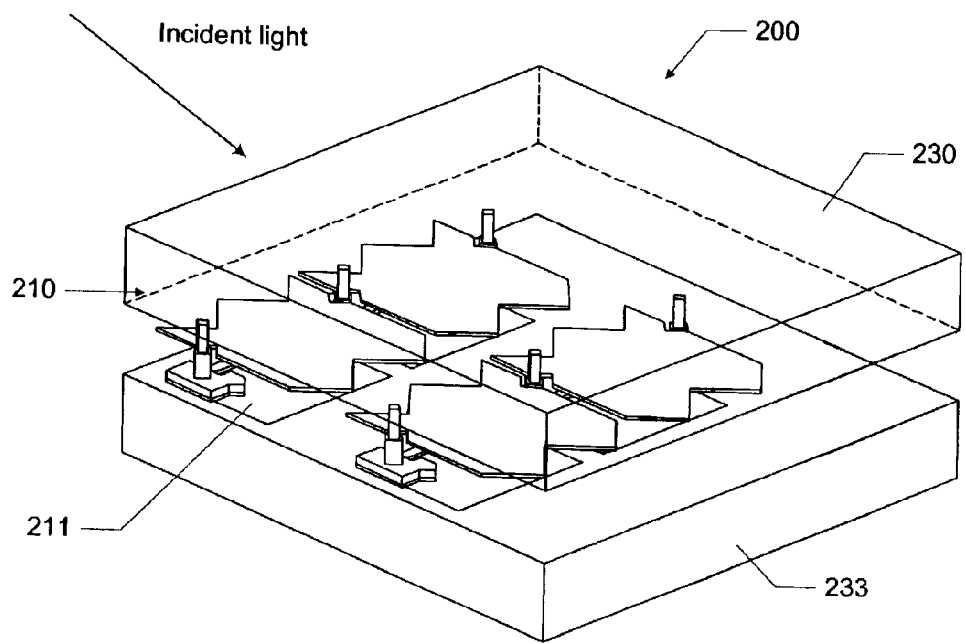
FIG. 2 shows a portion of the spatial light modulator used in the display system of FIG. 1 and a portion of an array of micro-mirrors comprised in the spatial light modulator.

In general, the spatial light modulator comprises an array of thousands or millions of micro-mirrors, only four being shown in FIG. 2. Referring to FIG. 2, an array of micro-mirrors 210 is formed on a substrate 200, such as glass that is visible light transmissive. Substrate 233, which comprises an array of electrodes (e.g. electrode 211) and circuitry (not shown), is placed proximate to the array of micro-mirrors for electro-statically controlling the motion of the micro-mirrors. In operation, each individual micro-mirror can be deformed as desired under the control of one or more electrodes and circuitry in substrate 233, thereby the spatial modulation of the incident light traveling through substrate 200 and shining on the surfaces of the micro-mirrors can be achieved.

Figure 3:
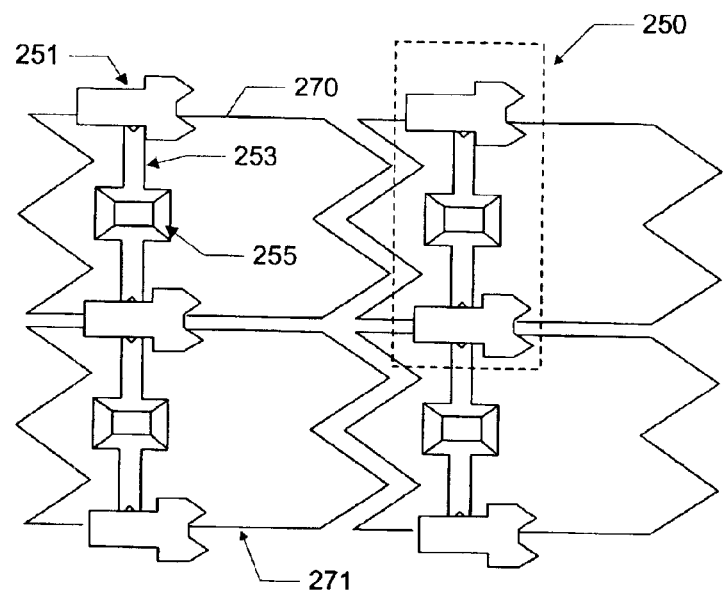
FIG. 3 is a back-view of a portion of the micro-mirror array of FIG. 2

Referring to FIG. 3, a back-view of the micro-mirror array shown in FIG. 2 is illustrated therein. As shown, each micro-mirror plate, such as micro-mirror plate 270, is attached to a hinge structure (e.g. hinge structure 250) such that the micro-mirror plate can rotate relative to the substrate by the hinge structure in a space between the two substrates (e.g. substrates 230 and 233 in FIG. 2). In order to improve the quality of displayed images, the hinge structure is preferably formed under the micro-mirrors as shown. Specifically, the hinge structure and the surface for reflecting the incident light are on the opposite sides of the micro-mirror plate. As also shown in FIG. 3, each hinge structure further comprises two posts, such as posts 251, hinge 253 and contact area 255. By "hinge" is meant the layer or stack of layers that defines that portion of the device that flexes to allow movement of the device (described in detail below). Though it is preferred that the posts and the contact area are formed in-line, this is not an absolute requirement. Instead, any suitable geometric configurations may also be used.

Figure 4:
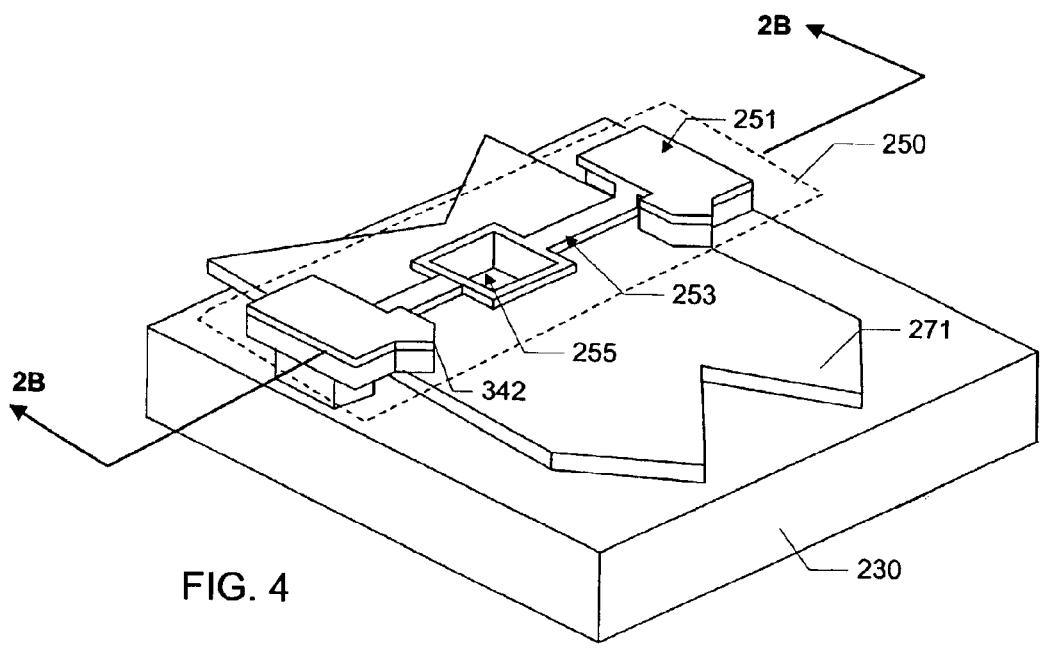
FIG. 4 demonstrates an exemplary micro-mirror device of the micro-mirror array of FIG. 3.

Referring to FIG. 4, a micro-mirror attached to a hinge formed on a substrate is illustrated therein. As shown, hinge structure 250 is formed on substrate 230. In its very basic configuration, hinge structure 250 comprises posts 251, hinge 253 and contact 255. Micro-mirror 271 is attached to the hinge and the contact such that it can rotate relative to the substrate by the hinge. The contact is preferably providing an electric contact with the micro-mirror such that the micro-mirror can be held at a particular voltage or electrically connected to the ground. Thereby, the rotation of the micro-mirror can be controlled by the applied electric field.

In operation, the micro-mirror plate rotates relative to the substrate by the hinge and reflects incident light under the control of electric field. This type of operation mechanism calls for certain requirements on the optical, mechanical and electric properties of the micro-mirror, hinge and the contact. In particular, the micro-mirror plate is desired to comprise of a material having high reflectivity to the light of interest, for example, a material of an early transition metal, metal or metal alloy. By "conductor", it is meant that a material whose resistivity is equal to or lower than 100,000 $\mu\Omega cm$, such as Al, Ti, $TiN_x$ or $TiSi_xN_y$. And by "insulator", it is meant that a material whose resistivity is higher than $10^{12}$ $\mu\Omega cm$. In addition, it is desired that the material of the micro-mirror also exhibits suitable mechanical properties (e.g. low creep rate, high strength and high elastic modulus etc.) for enhancing the mechanical property of the micro-mirror. Furthermore, it is desired that the material of the micro-mirror plate is electric conductor such that electric field can be applied thereon.

The hinge structure allows the micro-mirror plate to rotate. Because the hinge structure may scatter incident light and the scattered light can be mingled with the reflected light, the contrast ratio may be degraded. In order to suppress this type of scattering, the hinge structure is preferably "hidden" beneath the micro-mirror plate. For example, the hinge structure can be formed on a side that is opposite to the side of the micro-mirror plate for reflecting incident light. In accordance with the operation mechanism of the micro-mirror device and the constructional design, it is desired that the posts comprise materials that are insusceptible to plastic deformation (e.g. fatigue, creep or dislocation motion). It is preferred that such materials have large elastic modulus and exhibit high strength. Opposite to that of the posts, the materials of the hinge (e.g. hinge 253) are expected elastically deform because the hinge deforms while the micro-mirror rotates. Moreover, the hinge is desired to be electrically conducting such that the hinge can effectively transmit external electric signals to the micro-mirror plate, thereby, set up an electric field between the micro-mirror plate and the associated one or more electrodes for rotating the micro-mirror plate.

There are varieties of ways to construct the micro-mirror devices described above. Exemplary processes will be discussed in the following with references to FIG. 5A through FIG. 6. It should be appreciated by those ordinary skills in the art that the exemplary processes are for demonstration only and should not be interpreted as limitations.

Figure 5A:
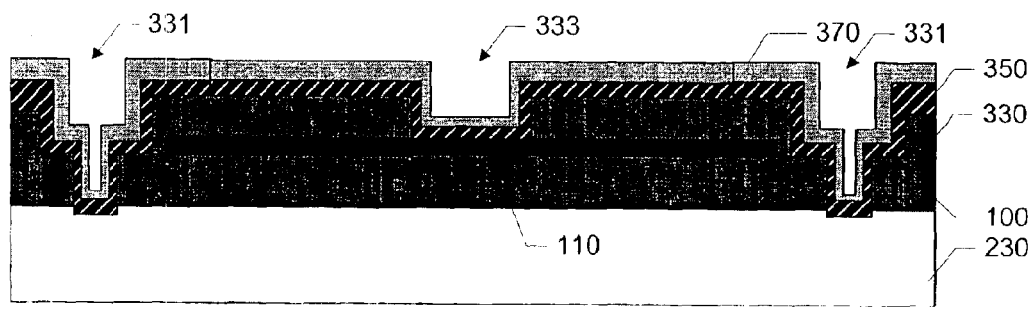
FIG. 5A is a cross-sectional view of the micro-mirror device of FIG. 4 before patterning the hinge structure layers during an exemplary fabrication process.

Referring FIG. 5A, substrate 230 is provided. First sacrificial layer 100 is deposited on the substrate followed by a deposition of micro-mirror plate layer 110. The substrate can be a glass (e.g. 1737F, Eagle 2000), quartz, Pyrex·8, sapphire etc. The substrate may also be a semiconductor substrate (e.g. silicon substrate) with one or more actuation electrodes and/or control circuitry (e.g. CMOS type DRAM) formed thereon.

First sacrificial layer 100 is deposited on substrate 230. First sacrificial layer 100 may be any suitable material, such as amorphous silicon, or could alternatively be a polymer or polyimide, or even polysilicon, silicon nitride, silicon dioxide, etc. depending upon the structural materials selected to be resistant to the etchant, and the etchant selected. If the first sacrificial layer is amorphous silicon, it can be deposited at 300–350° C. The thickness of the first sacrificial layer can be wide ranging depending upon the micro-mirror size and desired titled angle of the micro-mirror, though a thickness of from 500 Å to 50,000 Å, preferably around 10,000 Å, is preferred. The first sacrificial layer may be deposited on the substrate using any suitable method, such as LPCVD or PECVD.

After depositing the first sacrificial layer, a plurality of structure layers will be deposited and patterned as appropriated. According to the invention, a structural layer is a layer that will not be removed after the removal of the sacrificial layers. The first structural layer deposited on the first sacrificial layer is micro-mirror plate layer 110 for forming a micro-mirror plate. Because the micro-mirror plate is designated for reflecting incident light in the spectrum of interest (e.g. visible light spectrum), it is preferred that the micro-mirror plate layer comprises of one or more materials that exhibit high reflectivity (preferably 90% or higher) to the incident light. Examples of such materials are Al, Ag, $AlSi_xCu_y$, $AlTi_x$ or $AlSi_x$. Of course, other suitable materials having high reflectivity to the incident light of interest may also be adopted for the micro-mirror plate. In depositing the micro-mirror plate layer, PVD is preferably used. The thickness of the micro-mirror plate layer can be wide ranging depending upon many factors, such as desired mechanical (e.g. stiffness and strength) and electronic (e.g. conductivity) properties, the size, desired rotation angle of the micro-mirror plate and the properties of the materials selected for the micro-mirror plate. According to the invention, a thickness of from 500 Å to 50,000 Å, preferably around 2500 Å, is preferred. If the micro-mirror plate layer comprises aluminum, it is preferred to be deposited at 150° C. to 300° C. or other temperatures preferably less than 400° C.

Micro-mirror plate layer 110 is then patterned into a desired shape, an example of which is illustrated in FIG. 4. Though preferred, it would be appreciated by those ordinary skilled in the arts that this particular example of micro-mirror shape is a selection from a variety of optional choices of mirror shapes and is for demonstration purpose only. It should not be interpreted as a limitation. Instead, the micro-mirror plate can be of any desired shape. The patterning of the micro-mirror plate can be achieved using the standard photoresist patterning followed by etching using, for example $CF_4$, $Cl_2$, or other suitable etchant depending upon the specific material of the micro-mirror plate.

After the formation of the micro-mirror plate, second sacrificial layer 330 is deposited and patterned according to the desired configuration of the hinge structure. Second sacrificial layer 330 may comprise amorphous silicon, or could alternatively comprise one or more of the various materials mentioned above in reference to first sacrificial layer 100. First and second sacrificial layers need not be the same, though are the same in the preferred embodiment such that the etching process for removing these sacrificial layers can be greatly simplified. Similar to the first sacrificial layer, second sacrificial layer 330 may be deposited using any suitable method, such as LPCVD or PECVD. If the second sacrificial layer comprises amorphous silicon, the layer can be deposited around 350° C. The thickness of the second sacrificial layer can be on the order of 9000 Å, but may be adjusted to any reasonable thickness, such as between 2000 Å and 20,000 Å depending upon the desired distance (in the direction perpendicular to the micro-mirror plate and the substrate) between the micro-mirror plate and the hinge. Second sacrificial layer 330 may also fill in the trenches left from the patterning of the micro-mirror plate.

The deposited second sacrificial layer is patterned afterwards for forming two deep-via areas 331 and shallow via area 333 using standard lithography technique followed by etching. The etching step may be performed using $Cl_2$, $BCl_3$, or other suitable etchant depending upon the specific material(s) of the second sacrificial layer. The distance across the two deep-via areas 331 depends upon the side-to-side distance of the micro-mirror plate. In an embodiment of the invention, the distance across the two deep-via areas after the patterning is preferably around 10 $\mu$m, but can be any suitable distance as desired. In order to form shallow-via area 333, an etching step using $CF_4$ or other suitable etchant may be executed. The shallow-via area, which can be of any suitable size, is preferably on the order of 2.21 $\mu$m.

In order to form the desired deep-via area 331 profiles as shown, a via-mask and partial sacrificial layer etching are applied. According to an embodiment of the invention, the wider region of each deep-via area 331 is on the order of 1.0 to 2.0 um, preferably 1.4 um, and the smaller region is on the order of 0.5 to 1.5 um, preferably 1.0 um. Of course, other dimensions are possible depending upon the final size and shape of the micro-mirror plate. As an optional feature, the deep-via areas may reach through first sacrificial layer 100 and may reach from 500 Å to 2000 Å into substrate 230. As discussed above, the deep-via areas are formed in two etching steps. By doing so, the effect of resist erosion may be reduced, and step coverage of $SiN_x$ in the subsequent deep-via fill deposition may be improved. However, a single etching step can also be used.

After patterning the second sacrificial layer, hinge structure layers 350 and 370 are deposited on the patterned second sacrificial layer 330. During the deposition, layers 350 and 370 fill the formed deep-via areas 331 and shallow-via area 333. Because the hinge structure layers are designated to form the posts (e.g. 251 in FIG. 4) for holding the hinge (e.g. 253 in FIG. 4) and the micro-mirror plate (e.g. 270 in FIG. 4) attached thereto such that the micro-mirror plate can rotate relative to the substrate by the hinge, it is desired that the hinge structure layers (e.g. 350 and 370) comprise materials having a sufficiently large elastic modulus. According to an embodiment of the invention, layer 350 comprises a 300 Å thickness of $TiN_x$ layer deposited by PVD, and layer 370 comprises a 3500 Å thickness of $SiN_x$ layer deposited by PECVD. Of course, other suitable methods of deposition may be used, such as LPCVD or sputtering. Alternatively, layer 350 can be a Ti layer with a preferred thickness of 200 Å. Layer 350 is not necessary for the invention, but provides a conductive contact surface between the micro-mirror and the hinge structure in order to, at least, reduce charge-induced stiction. It is preferable to deposit the $TiN_x$ and SiNx layers such that the intrinsic stress is as low as possible, preferably lower than 250 MPa. The $SiN_x$ layer can be deposited at 400° C. Of course, other suitable materials, such as $CoSiN_x$, $TiSiN_x$ and/or $TiO_x$ may also be used for the hinge structure. As an optional feature of the invention, layer 350 is not deposited and only layer 370 is deposited for the hinge structure. In this case, layer 370 is $SiN_x$ with a thickness of 1000 Å to 10,000 Å, preferably 4000 Å.

Figure 5B:
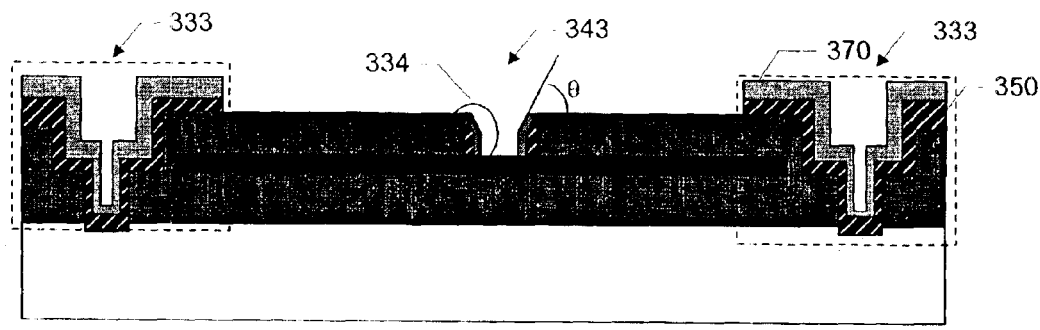
FIG. 5B is a cross-sectional view of FIG. 5A after patterning the hinge structure layers.

After the deposition, layers 350 and 370 are then patterned for forming the two posts 333 and contact 343 by etching using one or more proper etchants, as shown in FIG. 5B. In particular, the layers can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

Alternatively, the etching step can be performed after deposition of each hinge layer. For example, layer 350 can be etched and patterned after the deposition of layer 350 and before the deposition of layer 370.

After etching, two posts 333 and contact 343 are formed. According to the embodiment of the invention, each of the two posts 333 is formed with a tip 342 (as shown in FIG. 4) for limiting the rotation of the micro-mirror plate in operation. The physical configuration (e.g. position and length) of the tip, along with the distance between the micro-mirror plate and the substrate, determines the maximum rotation angle of the micro-mirror plate, wherein the maximum rotation angle can be used to define the "ON" state of the micro-mirror device. In this situation, a uniform configuration of the tips of all individual micro-mirror devices ensures a uniform "ON" state for all micro-mirror devices. This certainly improves the performance of the micro-mirror devices, thus improves the quality of displayed images.

The bottom segment of contact 343 is removed by etching and a part of the micro-mirror plate is thus exposed. The exposed part of the micro-mirror plate will be used to form an electric-contact with external electric source. The sidewalls of contact 343 are left with residues of layers 350 and 370 after etching. The residue 334 has a slope measured by angle θ approximately 75 degrees, but may vary between 0 and 89 degrees.

Figure 5C:
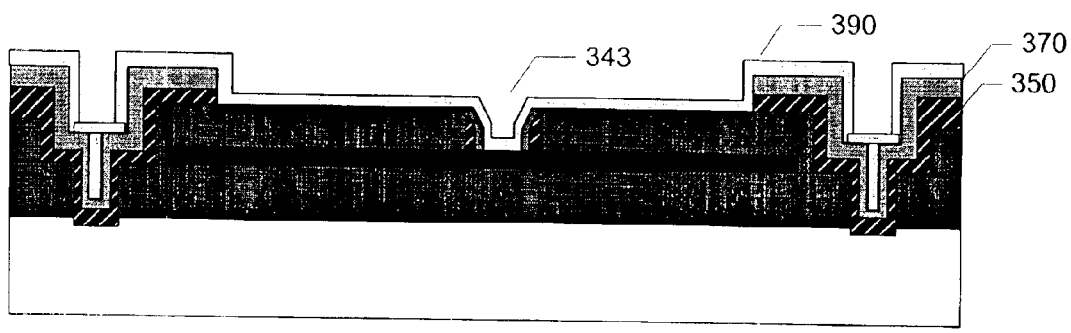
FIG. 5C is a cross-sectional view of FIG. 5B after depositing a and patterning hinge layers.

After the completion of patterning of layers 350 and 370, hinge layer 390 is deposited and then patterned as shown in FIG. 5C. Because the hinge deforms with the micro-mirror plate rotating, it is expected that the hinge is more susceptible to plastic deformation (e.g. fatigue, creep or dislocation motion). Furthermore, when the hinge is also used as electric conducting media for the micro-mirror plate, it is further expected that the hinge is electrically conductive.

Figure 5D:
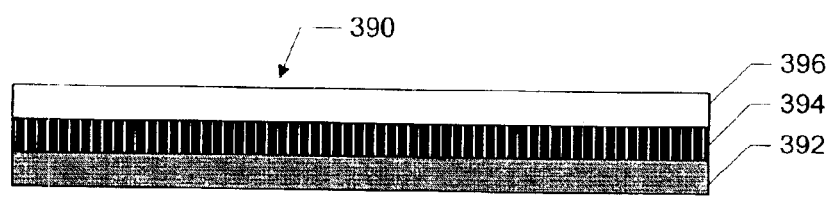
FIG. 5D is a cross-sectional view of a multiplayer hinge structure according to an embodiment of the invention.

According to an embodiment of the invention, hinge 390 is a multilayered structure, as shown in FIG. 5D. Referring to FIG. 5D, hinge 390 further comprises layers 392, 394 and 396. The outside layers 392 and 396 are electric conductors, such as an elemental metal substance, metalloid, inter-metallic compounds, conductive ceramics and metal alloys. And the intermediate layer is electric insulator, such as a ceramic. For example, the outside layers 392 and 396 comprise $TiN_x$, aluminum, titanium, Ir, titanium oxide(s), titanium carbide, $CoSi_xN_y$, $TiSi_xN_y$, $TaSi_xN_y$, $CoSi_xO_y$ or other ternary compositions such as set forth in U.S. patent application Ser. No. 09/910,537 to Reid filed Jul. 20, 2001 and Ser. No. 10/198,389 to Reid, filed Jul. 16, 2002, each incorporated herein by reference. In the preferred embodiment of the invention, the outside layers are $TiN_x$. The intermediate layer 394 can be any suitable ceramic, such as $SiN_x$, $SiO_x$, silicon carbide, or polysilicon. Therefore, a $TiN_x$—$SiN_x$—$TiN_x$ triple layer structure is preferably formed for the hinge. Alternatively W—$SiN_x(SiO_y)$—W, Al—$SiN_x(SiO_y)$—Al, Ti—$SiN_x(SiO_y)$—Ti or Ti or Ti(Al)—$SiN_x(SiO_y)$—Al(Ti) triple layer structure can also be formed for the hinge structure.

The thicknesses of the hinge layers can be adjusted depending on the materials selected and the desired mechanical and electric properties of the hinge, the stiffness of the movable element, the desired flexibility of the hinge, or other relevant factors. For example, for a Ti—$SiN_x$—Ti hinge stack, layer thicknesses on the order of 100–600–100 Å. For another example, for an Al—$SiO_x$—Ti triple structure, layer 392 is aluminum with a preferred thickness of 2500 Å for providing an efficient electric contact with the micro-mirror plate, and with layer 396 being titanium with a preferred thickness of 80 Å. The intermediate layer 394 is a ceramic insulating layer, such as $SiO_2$ with a thickness of 400 Å, for properly insulting layers 392 from 396. Furthermore, the ceramic insulting layer 394 may also enhance mechanical properties, such as creep resistance and/or resistance to plastic deformation, of the hinge. Of course, these layer thicknesses can vary widely depending on any of the above factors. The layer thicknesses can also be adjusted to affect the overall intrinsic stress of the hinge. For example, if each of the outside layers 392 and 396 exhibits an intrinsic stress of −100 MPa (compressive) and intermediate layer 394 exhibits an intrinsic stress of +150 MPa (tensile), the thickness of the intermediate layer can be increased to ensure that the average intrinsic stress is tensile.

If the intermediate layer thickness is increased to three times that of the outside layers, the average intrinsic stress is given by [(−100)*2+(150)*3]/(2+3), or +50 MPa (tensile).

According to another embodiment of the invention, layer 392 is an electrically conducting layer that comprises a material having a resistivity less than 100,000 $\mu\Omega$·cm. The intermediate layer 394 is an insulator with a resistivity greater than $10^{12}$ $\mu\Omega$·cm. And layer 396 is an electrically conducting layer with a resistivity also less than 100,000 $\mu\Omega$·cm.

According to yet another embodiment of the invention, layer 396 has a resistance to a gas-phase etchant higher than that of the intermediate layer 394. And layer 392 has a higher resistance than the intermediate layer 394 to the gas-phase etchant.

According to another embodiment of the invention, layers 396 and 392 are ceramic layers for enhancing the mechanical properties of the hinge. Exemplary materials for the outside layers 396 and 392 are silicon nitride(s), silicon oxide(s), silicon carbide(s), or polysilicon. And the intermediate layer 394 comprises electric conductors, such as single metal substance, metalloid, inter-metallic compounds, conductive ceramics and metal alloys. Exemplary materials for the intermediate layer 394 are $TiN_x$, aluminum, titanium, Ir, titanium oxide(s), titanium carbide, $CoSi_xN_y$, $TiSi_xN_y$, $TaSi_xN_y$, $CoSi_xO_y$ or other ternary compositions such as set forth in U.S. patent application Ser. No. 09/910,537 to Reid filed Jul. 20, 2001 and Ser. No. 10/198,389 to Reid, filed Jul. 16, 2002. For example, a $SiN_x(SiO_y)$—$TiN_x$(Ti, Al, W, $CoSi_xO_y$ or $CoSi_xN_y$)—$SiN_x(SiO_y)$ triple layer structure can be formed for the hinge. In this configuration, layer 392 comprises a ceramic material. Layer 396 is a ceramic layer, which can be the same as layer 392. And the intermediate layer 394 is an electric-conducting layer functioning as an electric conducting media such that an electric field can be set up between the micro-mirror plate and one or more electrodes. In this case, the intermediate layer 394 functions as an electric conducting media. In order to contact layer 394 with the micro-mirror plate at contact area 343, the first deposited ceramic layer 392 will be patterned and etched before depositing the electric conducting layer 394 such that the segment of the ceramic layer 392 at the contact area 343 will be removed. Therefore, the conducting layer 394 can make an electric contact with the micro-mirror plate at contact area 343 after being deposited.

In yet another embodiment of the invention, the intermediate layer 394 provides an electric contact with the micro-mirror plate. Ideal materials for this layer are expected to be "good" conductors (e.g. with high electric conductivity). In addition, it is expected that the materials of this layer exhibits proper mechanical properties, such as high strength and large elastic modulus. A typical candidate material is titanium. Other suitable materials, such as Cu and silver can also be used for layer 394. However, these materials, especially titanium, exhibit low resistances to oxidization. When used alone for the hinge, titanium hinge is oxidized, and desired mechanical and electrical properties would not be guaranteed. In order to diminish the oxidization of layer 394, the bottom layer 392 and the top layer 396 are deposited for passivating the oxidization of the intermediate layer 394. Layers 392 and 396 may comprise materials with high resistances to oxidation. Exemplary materials for these two layers are aluminum, $SiN_x$, $SiO_x$, Cr, $TiN_x$ and Au. Alternatively, an additional layer (not shown) can be deposited on the intermediate layer 394 before depositing the top layer 396. The additional layer can be deposited for enhancing the mechanical property of the hinge. Specifically, the additional layer can be $SiN_x$. In this regards, a tetra-layered structured, such as $TiN_x$—Ti—$SiN_x$—$TiN_x$ is formed for the hinge.

The multilayered structure as shown in FIG. 5D comprises three layers. It will be appreciated by those of ordinary skill in the art that the number of layers of the multilayered structure in FIG. 5D should not be interpreted as a limitation. Instead, any number of layers can be employed without depart from the spirit of the present invention.

In the embodiments described above, the hinge is a multilayered structure. However, the hinge can be a single electric conducting layer, such as single metals, metal compounds or metal alloys. Examples of suitable materials for the hinge layer are silicon nitride, silicon carbide, polysilicon, Al, Ir, titanium, titanium nitride, titanium oxide (s), titanium carbide, $CoSi_xN_y$, $TiSi_xN_y$, $TaSi_xN_y$, or other ternary and higher compounds. When titanium is selected for the hinge layer, it can be deposited at 100° C. to 400° C.

After deposition, the hinge layers are then patterned and etched. Similar to the hinge structure layers (layers 350 and 390), the hinge layers can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.). Alternatively, the hinge layers 392, 394 and 396 can be patterned and etched consecutively after depositions.

Figure 6:
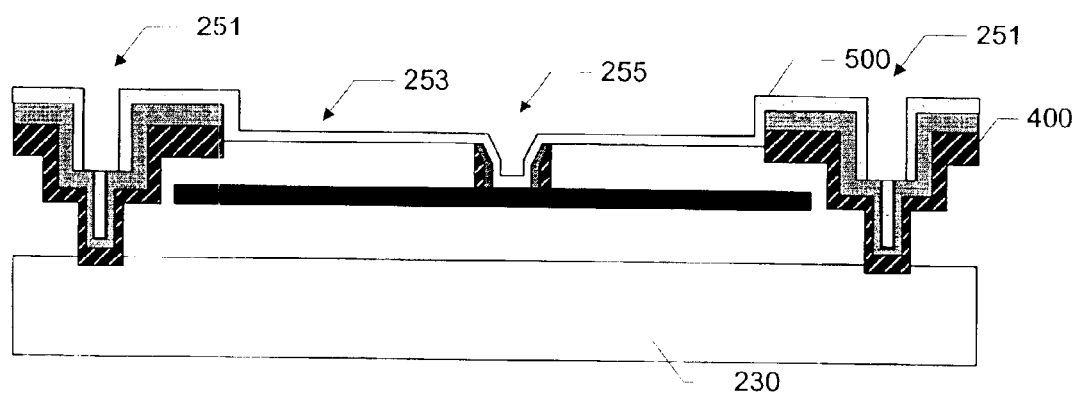
FIG. 6 is the cross-sectional view of FIG. 5D after removing the first and second sacrificial layers.

Finally, the first and second sacrificial layers 100 and 330 are removed using etching so as to release micro-mirror plate 110. FIG. 6 shows a cross-sectional view of the micro-mirror device after releasing. As can be seen in the figure, posts 251 is formed on substrate 230 and hold hinge 253, to which micro-mirror plate 110 is attached. The micro-mirror plate is capable of rotating relative to the substrate by the hinge.

The release etch utilizes an etchant gas capable of spontaneous chemical etching of the sacrificial material, preferably isotropic etching that chemically (and not physically) removes the sacrificial material. Such chemical etching and apparatus for performing such chemical etching are disclosed in U.S. patent application Ser. No. 09/427,841 to Patel et al. filed Oct. 26, 1999, and in U.S. patent application Ser. No. 09/649,569 to Patel at al. filed Aug. 28, 2000, the subject matter of each being incorporated herein by reference. Preferred etchants for the release etch are spontaneous chemical vapor phase fluoride etchants that, except for the optional application of temperature, are not energized. Examples include HF gas, noble gas halides such as xenon difluoride, and interhalogens such as $IF_5$, $BrCl_3$, $BrF_3$, $IF_7$ and $ClF_3$. The release etch may comprise additional gas components such as $N_2$ or an inert gas (Ar, Xe, He, etc.). In this way, the remaining sacrificial material is removed and the micromechanical structure is released. In one aspect of such an embodiment, $XeF_2$ is provided in an etching chamber with diluent (e.g. $N_2$ and He). The concentration of $XeF_2$ is preferably 8 Torr, although the concentration can be varied from 1 Torr to 30 Torr or higher. This non-plasma etch is employed for preferably 900 seconds, although the time can vary from 60 to 5000 seconds, depending on temperature, etchant concentration, pressure, quantity of sacrificial material to be removed, or other factors. The etch rate may be held constant at 18 Å/s/Torr, although the etch rate may vary from 1 Å/s/Torr to 100 Å/s/Torr. Each step of the release process can be performed at room temperature.

In addition to the above etchants and etching methods mentioned for use in either the final release or in an intermediate etching step, there are others that may also be used by themselves or in combination. Some of these include wet etches, such as ACT, KOH, TMAH, HF (liquid); oxygen plasma, $SeCO_2$, or supercritical $CO_2$ (the use of supercritical $CO_2$ as an etchant is described in U.S. patent application Ser. No. 10/167,272). Of course, the use of any of these etchants/methods requires that the material(s) to be etched are not resistant to the particular etchant used.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. In particular, the Sandia SUMMiT process (using polysilicon for structural layers) or the Cronos MUMPS process (also polysilicon for structural layers) could be used in the present invention. Also, a MOSIS process (AMI ABN—1.5 um CMOS process) could be adapted for the present invention, as could a MUSiC process (using polycrystalline SiC for the structural layers) as disclosed, for example, in Mehregany et al., Thin Solid Films, v. 355–356, pp. 518–524, 1999. Also, the sacrificial layer and etchant disclosed herein are exemplary only. For example, a silicon dioxide sacrificial layer could be used and removed with HF (or HF/HCl), or a silicon sacrificial could be removed with $ClF_3$ or $BrF_3$. Also a PSG sacrificial layer could be removed with buffered HF, or an organic sacrificial such as polyimide could be removed in a dry plasma oxygen release step. Of course the etchant and sacrificial material should be selected depending upon the structural material to be used. Also, though PVD and CVD are referred to above, other thin film deposition methods could be used for depositing the layers, including spin-on, sputtering, anodization, oxidation, electroplating and evaporation. Therefore, the invention as described herein contemplates all such embodiments as may come within the scope of the following claims and equivalents thereof.

We claim:

1. A micro-mirror device comprising a micro-mirror plate attached to a hinge for rotating relative to the substrate by the hinge, the hinge comprising:

a top metal layer comprising a metal that is an elemental metallic substance or an alloy or a metalloid;

a bottom metal layer comprising a metal that is an elemental metallic substance or an alloy or a metalloid; and an intermediate ceramic layer between the top and bottom metal layers.

2. The device of claim 1, wherein the top metal layer comprises an early transition metal.

3. The device of claim 2, wherein the early transition metal is a compound or alloy of titanium.

4. The device of claim 1, wherein the bottom metal layer comprises an early transition metal.

5. The device of claim 4, wherein the early transition metal is an elemental titanium, a compound or alloy of titanium.

6. The device of claim 1, wherein the ceramic layer is silicon oxide, silicon carbide or silicon nitride.

7. The device of claim 1, wherein the intermediate ceramic layer has a resistivity higher than 629 $10_{12}$ $\mu\Omega$·cm.

8. The device of claim 1, wherein the top metal layer has a resistivity lower than 100,000 $\mu\Omega$·cm.

9. The device of claim 1, wherein the bottom metal layer has a resistivity lower than 100,000 $\mu\Omega$·cm.

10. The device of claim 1, wherein the top metal layer has a higher selectivity to a gas-phase etchant than the intermediate ceramic layer, and wherein the bottom metal layer has a higher selectivity to a spontaneous chemical vapor phase etchant than the intermediate ceramic layer.

11. The device of claim 10, wherein the gas-phase etchant is xenon difluoride.

12. The device of claim 1, wherein the top metal layer comprises a material with a higher creep rate than the intermediate ceramic layer over the operating temperature of the plate, and wherein the bottom metal layer comprises a material with a higher creep rate than the intermediate layer over the operating temperature of the plate.

13. The device of claim 1, wherein the top layer and the bottom layer comprise the same material.

14. A micro-mirror device comprising a micro-mirror plate attached to a hinge for rotating relative to the substrate by the hinge, the hinge comprising:
   a top layer comprising a material with a creep rate at an operating temperature of the plate;
   an intermediate layer comprising a material with a creep rate lower than that of the top layer; and
   a bottom layer comprising a material with a creep rate higher than that of the intermediate layer.

15. The hinge of claim 14, wherein the top layer comprises a metal, metal alloy, or metal compound.

16. The hinge of claim 14, wherein the top layer comprises an early transition metal.

17. The hinge of claim 16, wherein the early transition metal is an elemental titanium, a compound or alloy of titanium.

18. The hinge of claim 16, wherein the bottom metal layer comprises a metal, metal alloy, or metal compound.

19. The hinge of claim 16, wherein the bottom layer comprises an early transition metal.

20. The hinge of claim 19, wherein the early transition metal is an elemental titanium, a compound or alloy of titanium.

21. The hinge of claim 16, wherein the intermediate layer comprises silicon oxide or silicon carbide or silicon nitride.

22. The hinge of claim 16, wherein the intermediate layer has resistivity higher than $10^{12}$ $\mu\Omega$·cm.

23. The hinge of claim 16, wherein the top layer has resistivity lower than 100,000 $\mu\Omega$·cm.

24. The hinge of claim 16, wherein the bottom layer has resistivity lower than 100,000 $\mu\Omega$·cm.

25. The hinge of claim 16, wherein the top layer has a higher resistance to a gas-phase etchant than the intermediate layer, and the bottom layer has a higher selectivity to a gas-phase etchant than the intermediate layer.

26. The hinge of claim 25, wherein the spontaneous chemical vapor phase etchant is xenon difluoride.

27. The hinge of claim 16, wherein the top layer and the bottom layer are the same.

28. A micro-mirror device comprising a micro-mirror plate attached to a hinge for rotating relative to the substrate by the hinge, the hinge comprising:
   a conductive top layer with a resistivity less than 100,000 $\mu\Omega$·cm;
   an insulator intermediate layer with a resistivity greater than 100,000 $\mu\Omega$·cm; and
   a conductive bottom layer with a resistivity less than 100,000 $\mu\Omega$·cm.

29. The hinge of claim 28, wherein the top layer comprises a metal, metal alloy, or metal compound.

30. The hinge of claim 28, wherein the top layer comprises an early transition metal.

31. The hinge of claim 30, wherein the early transition metal is an elemental titanium, a compound or alloy of titanium.

32. The hinge of claim 28, wherein the bottom layer comprises a metal, metal alloy, or metal compound.

33. The hinge of claim 28, wherein the bottom layer comprises an early transition metal.

34. The hinge of claim 33, wherein the early transition metal is an elemental titanium, a compound or alloy of titanium.

35. The hinge of claim 28, wherein the intermediate layer comprises silicon oxide or silicon carbide or silicon nitride.

36. The hinge of claim 28, wherein the top layer has a higher selectivity to a gas-phase etchant than the intermediate layer, and wherein the bottom layer has a higher selectivity to a gas-phase etchant than the intermediate layer.

37. The hinge of claim 36, wherein the gas-phase etchant is xenon difluoride.

38. The hinge of claim 28, wherein the intermediate layer has a lower creep rate than the top layer and the bottom layer.

39. The hinge of claim 28, wherein the top layer and the bottom layer are the same.

40. A micro-mirror device comprising a micro-mirror plate attached to a hinge for rotating along the hinge, the hinge comprising:
   a top layer with a resistance to a gas-phase etchant;
   an intermediate layer with a lower resistance than the top layer to the gas-phase etchant; and
   a bottom layer with a higher resistance than the intermediate layer to the gas-phase etchant.

41. The hinge of claim 40, wherein the top layer comprises a metal, metal alloy, or metal compound.

42. The hinge of claim 40, wherein the top layer comprises an early transition metal.

43. The hinge of claim 42, wherein the early transition metal is an elemental titanium, a compound or alloy of titanium.

44. The hinge of claim 40, wherein the bottom metal layer comprises a metal, metal alloy, or metal compound.

45. The hinge of claim 40, wherein the bottom layer comprises an early transition metal.

46. The hinge of claim 45, wherein the early transition metal is an elemental titanium, a compound or alloy of titanium.

47. The hinge of claim 40, wherein the intermediate layer comprises silicon oxide or silicon carbide or silicon nitride.

48. The hinge of claim 40, wherein the intermediate layer has resistivity higher than $10^{12}$ $\mu\Omega$·cm.

49. The hinge of claim 40, wherein the top layer has resistivity lower than 100,000 $\mu\Omega$·cm.

50. The hinge of claim 40, wherein the bottom layer has resistivity lower than 100,000 $\mu\Omega$·cm.

51. The hinge of claim 40, wherein the gas-phase etchant is xenon difluoride.

52. The hinge of claim 40, wherein the intermediate layer has a lower creep rate than the top layer and the bottom layer.

53. The hinge of claim 40, wherein the top layer and the bottom layer are the same.

54. A micro-mirror device comprising a micro-mirror plate attached to a hinge for rotating relative to the substrate by the hinge, the hinge comprising:

a top ceramic layer;

a bottom ceramic layer; and an intermediate conducting layer between the top ceramic layer and bottom ceramic layer.

55. The hinge of claim 54, wherein the intermediate metal layer comprises an early transition metal.

56. The hinge of claim 55, wherein the early transition metal is an elemental titanium, a compound or alloy of titanium.

57. The hinge of claim 54, wherein the top ceramic layer comprises silicon oxide or silicon carbide or silicon nitride.

58. The hinge of claim 54, wherein the bottom ceramic layer comprises silicon oxide or silicon carbide or silicon nitride.

59. The hinge of claim 54, wherein the top ceramic layer has resistivity higher than $10^{12}$ $\mu\Omega\cdot$cm.

60. The hinge of claim 54, wherein the intermediate conducting layer has resistivity lower than 100,000 $\mu\Omega\cdot$cm.

61. The hinge of claim 54, wherein the bottom ceramic layer has resistivity higher than $10^{12}$ $\mu\Omega\cdot$cm.

62. The hinge of claim 54, wherein the top ceramic layer has a higher resistance to a spontaneous chemical vapor phase etchant than the intermediate layer, and wherein the bottom ceramic layer has a higher resistance to a gas-phase etchant than the intermediate layer.

63. The hinge of claim 62, wherein the gas-phase etchant is xenon difluoride.

64. The hinge of claim 54, wherein the intermediate conducting layer comprises a material that is more susceptible to creep than the material comprising the top ceramic layer and the bottom ceramic layer.

65. The hinge of claim 54, wherein the top layer and the bottom layer are the same.

66. A micro-mirror device comprising a micro-mirror plate attached to a hinge for rotating relative to the substrate by the hinge, the hinge comprising:

a top layer with a creep rate at the device operating temperature;

an intermediate layer with a creep rate higher than that of the top layer; and a bottom layer with a creep rate lower than the intermediate layer.

67. The hinge of claim 66, wherein the intermediate layer comprises a metal, metal alloy, or metal compound.

68. The hinge of claim 66, wherein the intermediate layer comprises an early transition metal.

69. The hinge of claim 68, wherein the early transition metal is an elemental titanium, a compound or alloy of titanium.

70. The hinge of claim 66, wherein the top layer comprises silicon oxide or silicon carbide or silicon nitride.

71. The hinge of claim 66, wherein the bottom layer comprises silicon oxide or silicon carbide or silicon nitride.

72. The hinge of claim 66, wherein the top layer has resistivity higher than $10^{12}$ $\mu\Omega\cdot$cm.

73. The hinge of claim 66, wherein the intermediate layer has resistivity lower than 100,000 $\mu\Omega\cdot$cm.

74. The hinge of claim 66, wherein the bottom layer has resistivity higher than $10^{12}$ $\mu\Omega\cdot$cm.

75. The hinge of claim 66, wherein the top layer has a higher resistance to a spontaneous chemical vapor phase etchant than the intermediate layer, and wherein the bottom layer has a higher resistance to a spontaneous chemical vapor phase etchant than the intermediate layer.

76. The hinge of claim 75, wherein the gas-phase etchant is xenon difluoride.

77. The hinge of claim 66, wherein the top layer and the bottom layer are the same.

* * * * *